United States Patent [19]
Woodring

[11] Patent Number: 5,581,887
[45] Date of Patent: Dec. 10, 1996

[54] CONCH EXTRACTOR TOOL

[75] Inventor: Mark Woodring, Providenciales, Turks/Caicos Islands

[73] Assignee: Trade Wind Industries, Ltd., Br. Indian Ocean Ter.

[21] Appl. No.: 498,848

[22] Filed: Jul. 6, 1995

[51] Int. Cl.[6] .................................................. A22C 29/00
[52] U.S. Cl. .............................. 30/113.1; 30/356; 452/17
[58] Field of Search ................................ 30/113.1, 120.1, 30/355, 356, 342, 357; 452/17, 18

[56] References Cited

U.S. PATENT DOCUMENTS

| | | | |
|---|---|---|---|
| 282,677 | 8/1883 | Small et al. | 30/356 |
| 1,431,764 | 10/1922 | Steeples | 30/356 |
| 1,698,111 | 1/1929 | Terrell | 30/356 |
| 2,809,427 | 10/1957 | Bradford | 30/356 |
| 3,683,891 | 8/1972 | Eskridge et al. | 30/113.1 |

*Primary Examiner*—Hwei-Siu Payer
*Attorney, Agent, or Firm*—Malin, Haley, DiMaggio & Crosby

[57] ABSTRACT

A conch extraction tool for removing a conch from its shell. The tool is generally comprised of a flat helically shaped spring like material which is inserted near the foot of the conch and gently twisted into the shell and manipulated therein to disconnect the band that connects the conch to the shell thereby allowing the conch to be removed without damage to the shell or conch.

12 Claims, 1 Drawing Sheet

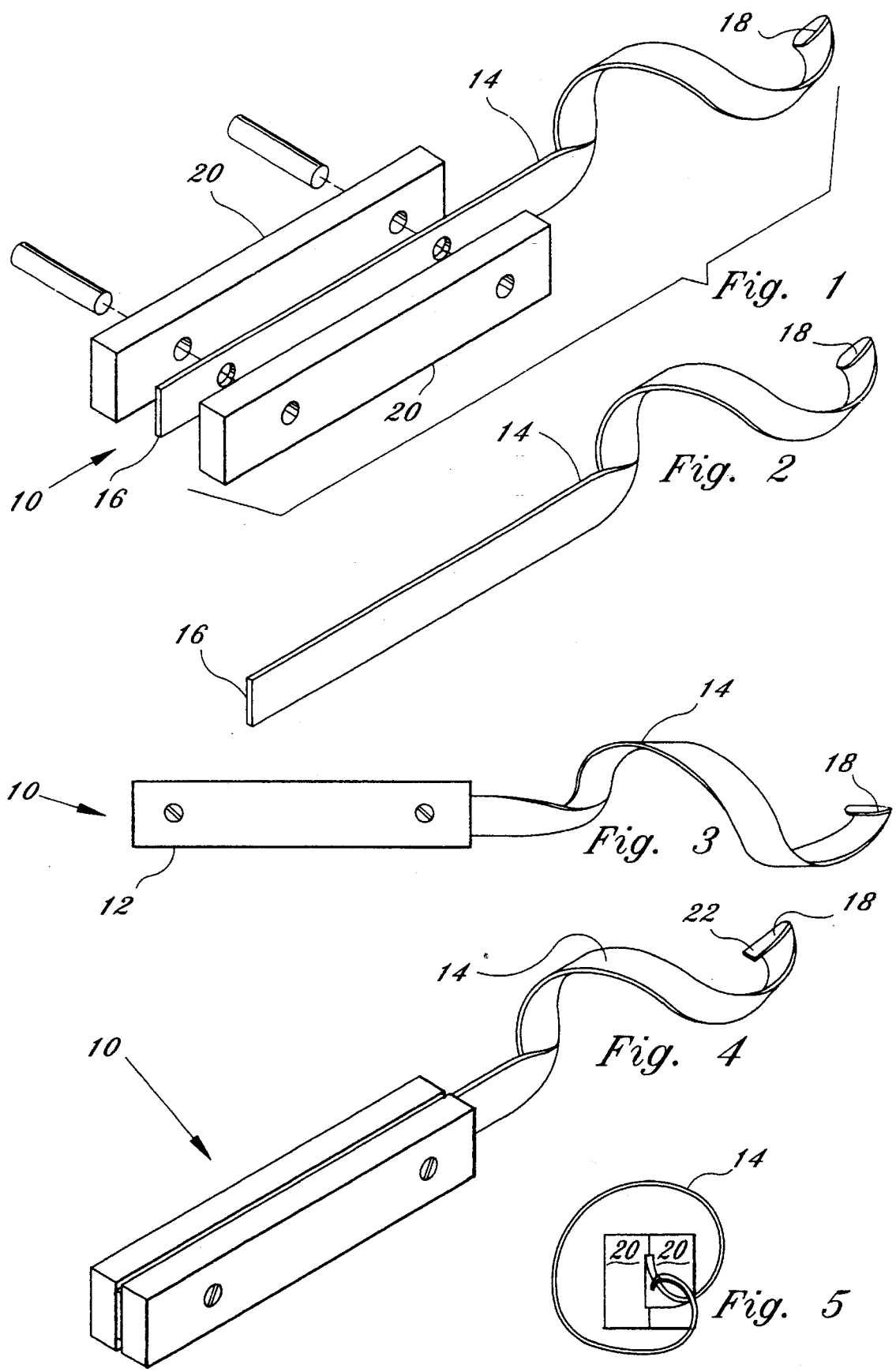

5,581,887

CONCH EXTRACTOR TOOL

BACKGROUND OF THE INVENTION

1. Field of the Invention

This invention relates generally to a conch extraction tool and more particularly to a helically-shaped blade that can remove a conch from its shell without damaging the conch or the shell.

2. Description of the Prior Art

Throughout the world, millions of pounds of conch meat are harvested and sold each year. The shelled animal is retrieved from the sea floor and brought to the surface where a hole is chopped in the shell by a small hatchet. Thereafter, a long, thin, sharp knife is inserted into the hole and the animal is cut from its attachment to the shell. This process is commonly referred to as "knocking." However, the hole resulting from the "knocking" process decreases the aesthetic value of the shell, as well as any monetary value the shell could bring. Accordingly, the empty shell is generally cast back into the ocean where over a period of years, it will break down and be absorbed back into the sea.

Currently, there are two methods of removing the conch without knocking a hole in the shell. The first method involves hanging the conch by its toenail until it drops the shell. However, this is a time-consuming process and also limits the use of the conch meat since it takes a few days for a conch to drop its shell. The second method involves a repeated freezing and thawing process which causes the conch to detach from its shell. This is an expensive method and also limits the use of the conch meat since it is frozen and not fresh. Accordingly, there is a present need for a conch tool extractor which can remove the conch from its shell without damaging the conch or the shell.

SUMMARY OF THE INVENTION

The present invention provides a conch extraction tool that can remove the conch from its shell without damaging the conch or the shell. The tool is characterized by a helically shaped flat blade having a handle for easy manual manipulation. The tool can be made in a range of sizes to fit the range of conch harvested, although one size will handle most of the commercially marketed conch.

In use, the tool is twisted into the shell where it slides up under the conch toward a band where the conch attaches itself to the shell. The tool acts to gently lift and separate the attachment band from the shell. Thereafter, the conch is pulled out of the shell without damage.

In accordance with the present invention it is an object of the invention to provide a conch extraction tool that can remove a conch from its shell without damaging the shell.

It is a further object of the invention to provide a tool that can remove the conch from its shell without killing the conch thereby allowing the conch meat to be shipped while the animal is still alive.

It is yet another object of this invention to provide a tool that quickly and efficiently removes a conch from its shell.

In accordance with these and other objects which will become apparent hereinafter, the instant invention will now be described with particular reference to the accompanying drawings.

BRIEF DESCRIPTION OF THE DRAWINGS

FIG. 1 is a perspective view of a preferred embodiment of the present invention;

FIG. 2 is a perspective view of a first alternate embodiment of the present invention;

FIG. 3 is a side elevational view of the preferred embodiment of the present invention;

FIG. 4 is a perspective view of a second alternate embodiment of the present invention;

FIG. 5 is a front elevational view of the preferred embodiment of the present invention.

DESCRIPTION OF THE PREFERRED EMBODIMENTS

With reference to FIGS. 1–3 there is depicted a conch extraction tool that is generally characterized by the reference numeral 10. As shown, the tool is generally comprised of a handle 12 and a helically shaped blade 14 having a proximal end 16 and an inwardly bent distal end 18.

In the preferred embodiment shown in FIGS. 1, 3, and 5, handle 12 has a rectangular cross-section large enough for easy manual manipulation. It is realized however that the handle can be of any shape so long as it is possible to manually grasp and manipulate the tool. Preferably, handle 12 is constructed of two rectangular cross sectional wood pieces 20. As shown in FIG. 1, wood pieces 20 are sandwiched around blade 14 and connected thereto with screws or the like.

Preferably, blade 14 is formed from a thin strip of metal generally rectangular in cross-section and having a thickness substantially less than its width or length. The blade may be coated with teflon or any other coating having a low coefficient of friction. Additionally, it is realized that the blade 14 may be constructed of other materials such as plastic which are flexible and can twist around the interior spirals of a conch shell without breaking.

As shown in FIGS. 1–3, the strip is twisted between its proximal end 18 and its distal end 16 to form the helically-shaped portion of blade 14. In general, blade 14 makes at least three quarters of one turn about the elongate axis of handle 12 between proximal end 16 and distal end 18. In the preferred embodiment, the tool 10 is formed into a compound spiral, that is, a rolled strip is pulled from two dimensions to a third while a twisting action is performed. Thereafter, the distal end of blade 14 is bent inwardly and blunted such that it forms a lifting surface to separate the conch from its shell. In an alternate embodiment, the strip may also form handle 12 as shown in FIG. 2. In this embodiment an elongate portion beginning at proximal end 16 is not twisted but left extended such that it forms a handle.

FIG. 4 shows a second alternate embodiment of the present invention. The second alternate embodiment incorporates a tooth 22 located at the blunted portion of the distal end tool 10o Preferably, tooth 22 is incorporated in the smaller version of the tool in order to aid in the tool's effectiveness in detaching the conch from its shell. As shown, tooth 22 is generally parallel to the elongate axis and points downwardly toward the handle, making distal end 18 wider, but not longer. In the preferred embodiment, blade 14 make at least three quarters of one complete revolution between proximal end 16 and distal end 18, but less than two complete revolutions, as shown in FIG. 5.

In use the conch is grasped in the left hand and held at a 45 degree angle downward, with the lip of the shell rolled to a vertical position. The distal end 18 of tool 10 is then placed on the inside spiral and gently twisted and inserted into the shell. At approximately one full turn, the tool will encounter a rough spot in the shell, which can be felt and heard. At this point, the tool is repeatedly rotated in small clockwise and counter-clockwise movements while inserting and extracting the tool. This action will loosen the attachment band (not shown) from the shell (also not shown). The operculum, or toenail, is then grasped, and with a rotating motion following the curve of the shell, the conch is removed from the shell. With practice, the conch will be removed completely intact from the shell each time the tool is used. Accordingly, the shell will be completely clean and therefore easier to process in the shell markets. Additionally, the conch will remain alive thereby allowing the animal to be shipped live.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A tool for removing a conch from its shell, comprising:
   a handle; and
   a blade, said blade having a proximal end and a distal end, said blade connected to said handle at said proximal end, said blade extending spirally from said handle, said blade making at least three quarters of one complete spiral revolution between said proximal end and said distal end wherein a tooth extends from said distal end of said blade, said tooth extending downwardly toward said proximal end.

2. The tool as set forth in claim 1 wherein said blade is coated with teflon.

3. The tool as set forth in claim 1 wherein said handle is rectangular.

4. The tool as set forth in claim 1 wherein said handle is formed from wood.

5. A tool for removing a conch from its shell, comprising:
   a blade, said blade having a proximal end and a distal end, said blade forming a handle between said proximal end and a point between said proximal end and said distal end, said blade making at least three-quarters of one complete revolution between said point and said distal end wherein said blade is metal and coated with teflon.

6. A tool for removing a conch from its shell, comprising:
   a blade, said blade having a proximal end and a distal end, said blade forming a handle between said proximal end and a point between said proximal end and said distal end, said blade making at least three-quarters of one complete revolution between said point and said distal end, wherein said blade further comprises an inwardly bent portion of said distal end.

7. A tool for removing a conch from its shell, comprising:
   a blade, said blade having a proximal end and a distal end, said blade forming a handle between said proximal end and a point between said proximal end and said distal end, said blade making at least three-quarters of one complete revolution between said point and said distal end, wherein a tooth extends from said distal end of said blade, said tooth extending downwardly toward said proximal end.

8. The tool as set forth in claim 7 wherein said blade is formed from plastic.

9. A tool for removing a conch from its shell, comprising:
   a handle; and
   a blade, said blade having a proximal end and a distal end, said blade connected to said handle at said proximal end, said blade extending spirally from said handle, said blade making at least three quarters of one complete spiral revolution between said proximal end and said distal end, wherein said blade further comprises an inwardly bent portion at said distal end.

10. A tool for removing a conch from its shell, comprising:
    a handle; and
    a blade, said blade having a proximal end and a distal end, said blade connected to said handle at said proximal end, said blade extending spirally from said handle, said blade making at least three quarters of one complete spiral revolution between said proximal end and said distal end, further comprising a tooth, said tooth formed in said distal end of said blade, said tooth pointing downwardly toward said handle.

11. A tool for removing a conch from its shell, comprising:
    a blade, said blade having a proximal end and a distal end, said blade forming a handle between said proximal end and a point between said proximal end and said distal end, said blade making at least three-quarters of one complete revolution, but less than two complete revolutions, between said point and said distal end.

12. A tool for removing a conch from its shell, comprising:
    a handle; and
    a blade, said blade having a proximal end and a distal end, said blade connected to said handle at said proximal end, said blade extending spirally from said handle, said blade making at least three quarters of one complete spiral revolution, but less than two complete revolutions, between said proximal end and said distal end.

* * * * *